(12) United States Patent
Pham et al.

(10) Patent No.: US 10,518,516 B2
(45) Date of Patent: Dec. 31, 2019

(54) METHOD AND SYSTEM OF FORMING A COMPOSITE LAMINATE

(71) Applicant: The Boeing Company, Chicago, IL (US)

(72) Inventors: Doan Dinh Pham, Richland, MI (US); William Brent Harlow, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1027 days.

(21) Appl. No.: 14/529,472

(22) Filed: Oct. 31, 2014

(65) Prior Publication Data

US 2016/0121589 A1   May 5, 2016

(51) Int. Cl.
| | | |
|---|---|---|
| *B32B 37/10* | (2006.01) | |
| *B32B 37/06* | (2006.01) | |
| *B29C 70/34* | (2006.01) | |
| *B29C 70/44* | (2006.01) | |

(52) U.S. Cl.
CPC ........ *B32B 37/1018* (2013.01); *B29C 70/342* (2013.01); *B29C 70/44* (2013.01); *B32B 2367/00* (2013.01)

(58) Field of Classification Search
CPC .............................. B65H 83/02; B32B 43/006
See application file for complete search history.

(56) References Cited

U.S. PATENT DOCUMENTS

| | | | |
|---|---|---|---|
| 5,648,109 A | * | 7/1997 | Gutowski ............. B29C 51/085 156/212 |
| 6,814,916 B2 | | 11/2004 | Willden et al. |
| 7,118,370 B2 | | 10/2006 | Willden et al. |
| 7,651,650 B2 | | 1/2010 | Willden et al. |
| 8,142,181 B2 | | 3/2012 | Willden et al. |
| 8,236,222 B2 | | 8/2012 | Henderson et al. |

(Continued)

OTHER PUBLICATIONS

Wang, etc. (2011). Polymer Matrix Composites and Technology—6.4.1 The Effect of Curing Process Parameters on Properties of Composite Materials. (pp. 304-306). Woodhead Publishing, (retrieved from Internet on Apr. 9, 2019 app.knovel.com/hotlink/pdf/id:kt00U03ZF4/polymer-matrix-composites (Year: 2011).*

(Continued)

*Primary Examiner* — Michael N Orlando
*Assistant Examiner* — Marta S Dulko
(74) *Attorney, Agent, or Firm* — McDonnell Boehnen Hulbert & Berghoff LLP

(57) ABSTRACT

A method and associated system for forming composite materials is presented, including providing a composite charge having applied release films to top and bottom surfaces and positioned on a contoured forming tool such that a portion of the composite charge over hangs a second upper surface of forming tool. A fairing bar abuts the forming tool that has an uppermost surface positioned above the second upper surface of the forming tool. The combination of the positioning of the fairing bar and the use of release film in contact with the composite charge allows the composite charge to conform to the contoured forming tool without bridging or wrinkling the composite charge when a forming membrane and applied vacuum are used.

8 Claims, 5 Drawing Sheets

(56) References Cited

U.S. PATENT DOCUMENTS

| | | | | |
|---|---|---|---|---|
| 2002/0195524 A1* | 12/2002 | Amaoka | ................... | B64C 3/00 |
| | | | | 244/123.2 |
| 2010/0170631 A1* | 7/2010 | Kim | ..................... | B29C 53/025 |
| | | | | 156/212 |
| 2010/0310818 A1* | 12/2010 | Pridie | ................. | B29C 43/3642 |
| | | | | 428/114 |
| 2012/0076973 A1* | 3/2012 | Guzman | .............. | B29C 70/207 |
| | | | | 428/113 |
| 2012/0121866 A1* | 5/2012 | Hawkins | ................ | B29C 70/30 |
| | | | | 428/174 |

OTHER PUBLICATIONS

U.S. Appl. No. 14/295,884 Composite Pre-Preg Drape Forming with Controlled Laminate Supports (Coxon et al, 2014).

\* cited by examiner

it is time consuming and expensive to perform ply and ply lay-up.

METHOD AND SYSTEM OF FORMING A COMPOSITE LAMINATE

TECHNICAL FIELD

This disclosure generally relates to systems and processes for forming a laminate composite, particularly using a complex shaped and contoured forming tool.

BACKGROUND

Formed composite parts are commonly used in applications, such as aircraft and vehicles, where lightweight and high strength are desired. Fabricating composite parts, for example a ply-by-ply airplane wing stringer, requires the use of a lay-up tool (also known as a base tool, forming tool or mandrel) on which layers of composite materials or pre-cure lamina are hand formed or laid one ply at a time. These applications can utilize complex contoured finished parts or channels that must be formed and then cured. Historically, complex contoured composite structures have entailed extensive hand labor to form them prior to curing. Typically, the pre-impregnated composite fiber plies ("pre-pregs") such as epoxy impregnated carbon fiber laminates are laid by hand or by a machine over a tool or mandrel. Once the desired numbers of layers are placed on the tool, the composite laminate is bagged and cured in a curing apparatus, such as an autoclave. Unfortunately, laying-up of a composite charge over a complex shaped forming tool creates several challenges and must be done manually by hand. It is time consuming and expensive to perform ply and ply lay-up.

One forming method, known as drape forming, uses vacuum bagging. Drape forming has been used successfully to form composite parts where the parts being formed are formed over tools that only have male radius. This method involves heating a flat laminate pre-preg composite blank or charge and forcing it around a forming tool with the use of a vacuum bag. However, this method has met with limited success on tools with female radius or more complex shapes.

Vacuum bag drape forming of such parts can often result in wrinkling and/or pinching of the plies. Wrinkles occur because some laminate plies are in compression when bent or urged over the forming tool, and buckle when there is no constraint on the bending portion to prevent out-of-plane-buckling. Similarly, on long flange parts, slip resistance between the plies during bending becomes too great, and inner plies buckle. Buckling or wrinkling of the plies also occurs over tools that are curved or contoured, or have joggles along their length. Even slight contours of a radius on the order of thousands of inches is enough to initiate wrinkles.

In particular, when using a Z-shaped tool, the male and female radii create challenges in the hot drape process as the charge may only form over the male radius. As the composite pre-preg charge is bent over the forming tool, if the length of the flange is too long or slip resistance between the plies is too great, out-of-plane-buckling of the laminate will occur. This results in the use of a time consuming two-step process where a special tool is used to form the male radius and then separately to form the female radius, typically using hand lay-up techniques.

Although there has been limited success with use of release films applied to the base tool, because these films have inherently have low tack properties they do not provide a stable and secure surface for the lay-up of the plies of composite pre-preg material. This can result in slower than desired laydown rates and an increase in scrapped parts.

Accordingly, there is a need for improved hot drape systems and methods of laying-up composite plies over a complex and contoured forming tool that avoids or minimizes hand lay-up processes and wrinkling that is experienced with prior known methods.

SUMMARY

The disclosed embodiments provide a method for forming composite materials where a composite charge having a layer of release film applied to the upper and lower surfaces is used in a lay-up system.

A first portion of the composite charge is positioned on a first upper surface of a forming tool such that a second portion of the composite charge overhangs a second upper surface of the forming tool. The first upper surface of the forming tool is higher in height that the second upper surface. The height of the surfaces is measured from a common bottom surface. A fairing bar is positioned to abut the forming tool, where the fairing support has an uppermost surface and is positioned such that an uppermost surface is above the second upper surface of the forming tool. A forming membrane is applied over the composite charge, release film, forming tool and fairing bar and is sealed around a peripheral edge of the lay-up system. Vacuum is applied to the lay-up system to cause the forming membrane to conform to the forming tool such that the second portion of the composite charge is brought into contact with the second upper surface of the forming tool such that the forming membrane is conformed to and contacts the fairing bar before the forming membrane conforms the second portion of the composite charge to the second upper surface. In some circumstance it is desirable to heat the composite charge before and or during the evacuation of forming membrane. Stated differently, the vacuum causes the forming membrane to conform to the forming tool such that a portion of a laid-up composite charge is brought into contact with a surface of the forming tool located between the first and second upper surfaces and a remaining portion of the composite contacts and slides along the second upper surface.

Application of the vacuum causes the composite charge to conform a segment of the second portion over an outer radius of the forming tool. A mechanical force is applied to the second portion of the composite charge to conform the composite charge to an inner radius of the forming tool. The mechanical force can be applied using an urging device includes at least one of a flexible tip, a spring board, a feather board, an elastic fairing, a compressible material, a pivoting pad, and a spring-loaded pad. In one preferred method the forming of the composite charge to both an inner and outer radius of the forming tool occurs where the forming membrane dose not prevent the second portion of the composite charge from sliding along the second upper surface of the forming tool to conform to the inner radius. Stated differently, the fairing bar configuration and positioning relative to the forming tool prevents the forming membrane from applying a downward force on the second portion of the composite charge that prevents the second portion from sliding or slipping along the second upper surface of the forming tool. To achieve the necessary degree of slippage of the second portion of the composite charge it may also be advantageous to apply release film to the second upper surface of the forming tool prior to positioning the composite charge on the forming tool such. In this situation the release film on the bottom surface of the composite charge would be in sliding contact with release film on the second upper surface of the forming tool.

A lay-up system for forming composite materials is also disclosed that includes a forming tool comprising a first upper surface, a second upper surface, a bottom surface, an outer radius and an inner radius, where the forming tool has a first height measured from the first upper surface to a bottom surface and a second height measure from the second upper surface to the bottom surface. The system further includes a fairing bar abutting the forming tool that has a height greater than the second height of the forming tool, where the height of the fairing bar is measured from an uppermost surface to a lower most surface. A composite charge is part of the lay-up system that has an upper surface and a lower surface, each having an applied layer of release film. The composite charge also has a first portion that will contact the first upper surface of the forming tool and has a second portion that will overhang the second upper surface of the forming tool. A forming membrane is used to overlay the composite charge, release film, forming tool and fairing bar such that a vacuum system will draw a vacuum sufficient to cause the forming membrane to conform to the forming tool such that the portion of the composite charge over hanging the second is brought into contact with a second upper of the forming tool after the forming membrane is conformed to and contacts the fairing bar.

The forming tool used in the system of this disclosure can be complex in shape having at least an outer radius and an inner radius, where the outer radius is contiguous with the first upper surface of the forming tool and the inner radius is contiguous with the second upper surface. A release film of fluorinated ethylene-propylene can be advantageously used along with a forming membrane made from silicone. The second upper surface of the forming tool can also contain a layer of release film to assist in the conformation of the second portion of the composite charge to the female or inner radius of the forming tool.

The features, functions, and advantages that have been discussed can be achieved independently in various embodiments or may be combined in yet other embodiments, the further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

A first step common to the processes and systems described in connection with various embodiments of the invention described here involves providing a suitable forming or lay-up tool. Existing forming tools can be used or in some circumstances a forming tool is fabricated to represent the tooled surface of the desired part, for example an airplane wing stringer or other primary or secondary structures, namely, Z-shaped beams, I-beams, hat stiffeners, C-channels, J-stiffeners, blade-stiffeners, floor-beams, ribs, frames, or spars. Fabrication and/or construction of forming tools are known to those skilled in the art and therefore such details need not be repeated here. When the forming tool has a complex shape with contours, for example a Z-shaped beam, it becomes more challenging to conform a laminate composite (also known as a composite charge) to the forming tool without wrinkling or the use of time consuming hand lay-up procedures.

Figure 1:
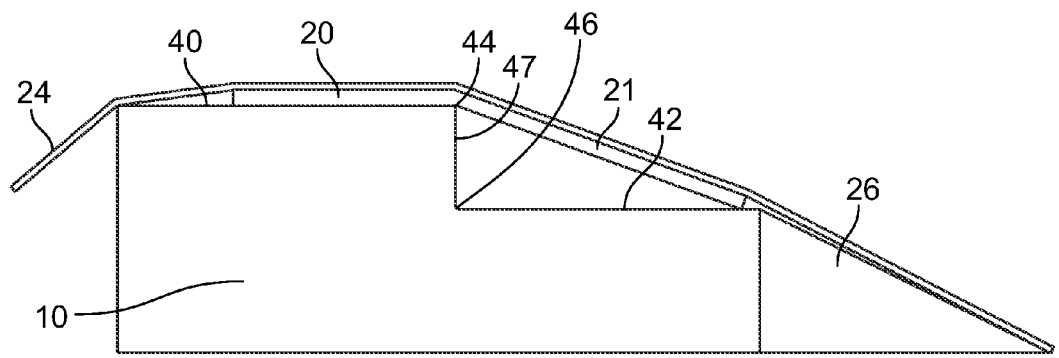
FIG. 1 is a schematic illustration of a side view of a known lay-up system for use with contoured forming tools.
Figure 2:
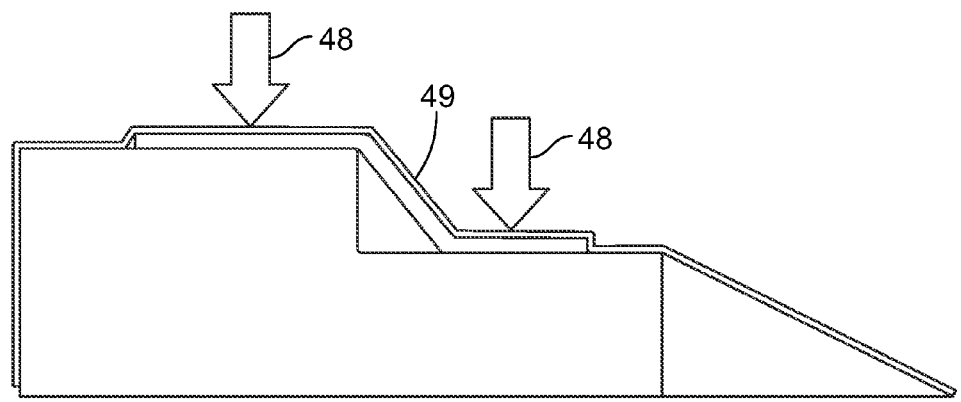
FIG. 2 is an illustration of the known lay-up system of FIG. 1 after a forming membrane is applied and evacuation begins.
Figure 3:
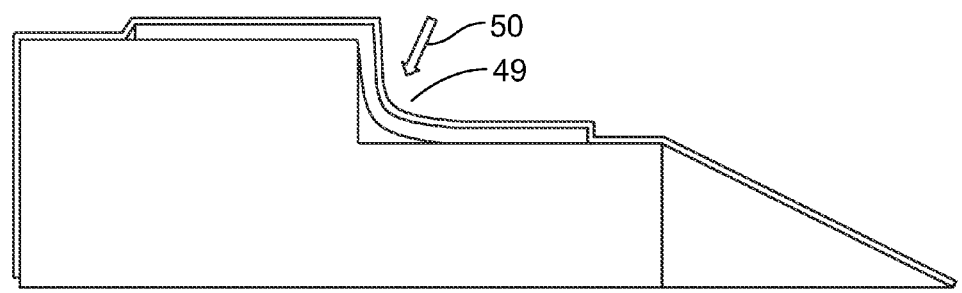
FIG. 3 is an illustration of the known lay-up system of FIG. 2 showing the application of mechanical force while a vacuum is applied in an attempt to eliminate bridging of the composite charge in the inner or female radius.

To illustrate some of the challenges with the current methods of forming complex composites FIGS. 1-3 present step-by-step cross-sectional views of a prior art vacuum bag forming system for forming composite materials. A composite charge 20 is placed over a forming tool 10, As exemplified, the tool 10 is a Z shaped forming tool having an outer radius 44 and an inner radius 46. Such a forming tool can be used to manufacture a composite Z-shaped beam or spar. It will be appreciated that the composite charge may be any suitable material for forming composite parts, including, without limitation, dry fabric or pre-preg plies. The tool 10 rests upon or is linked to a vacuum base. The vacuum base, tool 10, and composite charge 20 are covered by a vacuum bag or membrane 24.

During forming of the composite charge 20 over the forming tool 10, the charge 20 is heated and air is evacuated from beneath the vacuum bag 24 causing the membrane 24 of the vacuum bag to be drawn down and conform to the tool 10 and to fairing bar 26. (see FIG. 2). This causes a first portion of the composite charge 22 to be forced down against the first upper surface 40 of tool 10. Portion 21 of the composite charge 20 overhangs the second upper surface 42 of the forming tool 10, As shown in FIG. 2, the application of the heat and vacuum causes the laminate plies in the overhanging portion 21 and in first portion 22 of the composite charge 20 to be held in a non-slip abutment against the first upper surface 40 and the second upper surface 42 of the forming tool, respectively. The forming membrane 24 exerts a downward pressure on the two portions at the two surfaces holding the composite charge so that there is relatively little slippage along the two upper surfaces of the forming tool. The tool has a male or outer radius 44 and a female or inner radius 46. Because of the downward pressure 48 exerted by the forming membrane while a vacuum is being drawn, the overhanging portion 21 cannot conform to the female radius 46 resulting in an undesirable bridging 49 or non-conformance to the inner radius by the second portion of the composite charge. Even with applied mechanical force 50 the composite charge is unable to completely conform to the female radius resulting in both wrinkling and bridging 49 of the overhanging portion 21 near, but not conformed to, the female radius 46. (see FIG. 3). Forcing the composite charge into the female radius with a hand tool will further exasperate the unwanted wrinkling.

Therefore, an unmet need exists for a composite forming method and system that forms laminate charges using forming tools with contours, joggles, or long flanges, without out-of-plane buckling of the laminate plies.

Figure 4:
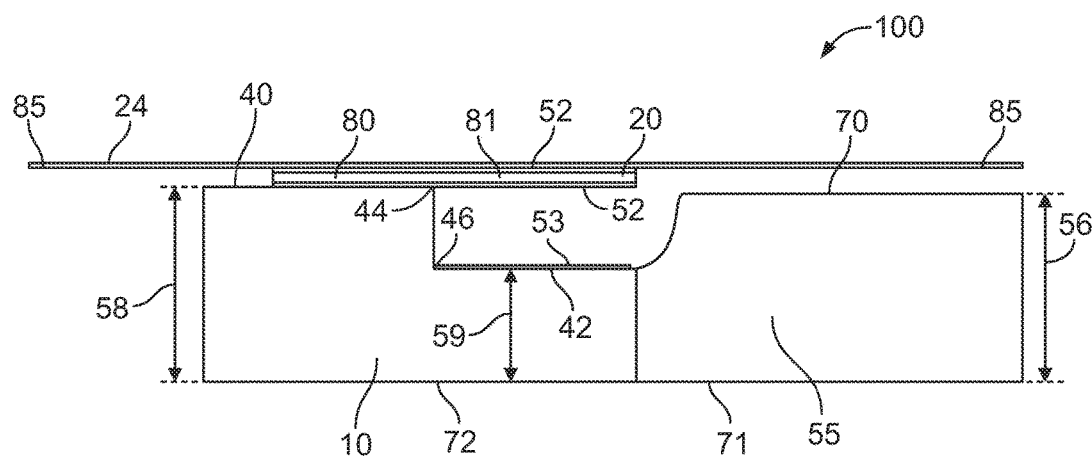
FIG. 4 is an illustration of the lay-up system of this disclosure after the composite charge is positioned on the forming tool and the forming membrane is placed over the composite charge, forming tool and a fairing bar.
Figure 7:
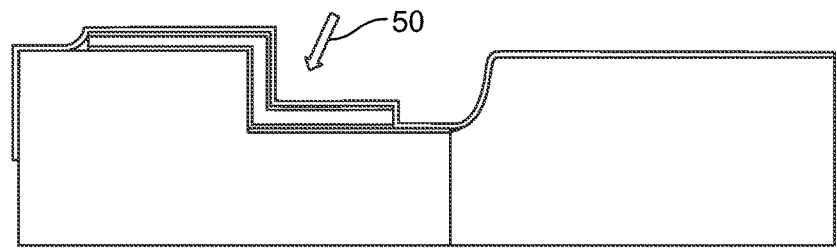
FIG. 7 is an illustration of the lay-up system of FIG. 4 where the composite charge has conformed to the forming tool including the outer and inner radii without bridging.
Figure 7A:
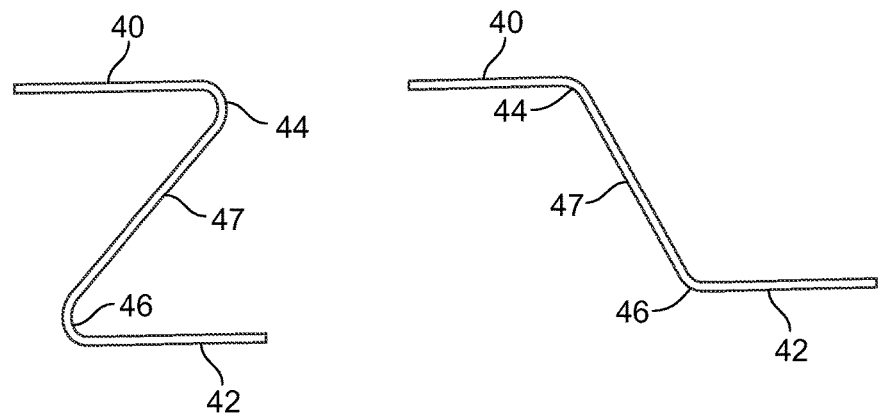
FIG. 7a is a schematic representation of two possible Z-shaped tools or formed composite parts that can be used in or produced by, respectively, the lay-up system of the present disclosure.

Starting with reference to FIG. 4, an exemplary embodiment of the present disclosure is described in detail using, for example, a Z-shaped forming tool 10 as part of lay-up system 100. The forming tool has a first upper surface 40 and a second upper surface 42. The first upper surface has a first height 58 measured from the bottom surface 72 and the second upper surface 42 has a second height 59 likewise measured from bottom surface 72. The first and second upper surfaces 40 and 42 are generally facing upwards and away from the tool bottom 72. The orientation of these upper tool surfaces, of course, is a function of the complexity and contours of forming tool itself. In the exemplified Z-shape forming tool discussed herein the two upper surfaces are generally parallel to each other and to the bottom surface, however, non-parallel surfaces could also be employed. The forming tool 10 also has a male radius 44 and a female radius 46. For illustration purposes, all the figures schematically illustrate a small radius of curvature located at the intersection or corner 44, 46 of the horizontal relatively flat surfaces 40 & 42 and a vertical relatively flat surface 47 and the relationship of the flat surfaces is about 90 degrees. The radius of the corners 44 and 46 could range from about 0.125 inch to about 0.5 inch and the relative angle between the flat surfaces that transition into the radii of curvatures could be in the range of from about 60 degrees to about 120 degrees. In other words the transition from surface 40 to surface 47 and from surface 47 to surface 42 could define a curve or radius of a circle, i.e., the radius of curvature. Reference is made to FIG. 7a that illustrates two possible cross-sectional shapes for a Z-shaped forming tool or resultant composite part.

Once the forming tool is in a ready position, an optional release film 53 be placed on the second upper surface 42 such that it will contact a portion of release film 52 on the bottom surface of composite charge 20. When the optional release film 53 is used, vacuum can be used to drawdown the release film 53 to the second upper surface 42 of the forming tool 10 to hold the release film place and to conform it to the shape of the forming tool. This will provide a release film-to-release film interface for the second portion 81 of the composite charge 20 when the second portion is contacted with the second upper surface 42 of the forming tool. Preferably, the release film used in the lay-up system of this disclosure is of a composition that is acceptable to be used in contact with uncured pre-preg material and provides one or more non-sticky or low tack surfaces. For example, such a release film is preferably composed of fluorinated ethylene-propylene (FEP) and selected so as not to adversely affect the resin content and/or resin-to-fiber ratio of the composite charge used in the lay-up method. Other types of release films can be used, including, but not limited to, polytetrafluoroethylene (PTFE), ethylene tetrafluoroethylene (ETFE), Polyvinyl Fluoride (PVF) and TOOLTEC® (reinforced PTFE coated fiberglass with adhesive). The release films applied to the composite charge 20 can be the same or different, and the release film 53 applied to the forming tool can be the same or different as the other applied release films 52. FIG. 4 shows schematically the use of three release films. The release films 52 and 53 can have a thickness in the range of from about 0.002 to about 0.005 inches.

The composite charge 20 is positioned on the forming tool 10 such that a first portion 80 of the composite charge 20 overlays the first upper surface 40 of the forming tool 10 and a section portion 81 overhangs the second upper surface 42. The composite charge 20 has release film 52 applied to both the top and bottom surfaces of the composite charge. A fairing bar 55 abuts the forming tool 10 and is configured in the lay-up system 100 such that the uppermost surface 70 is higher than the second upper surface 42. The height 56 of the fairing bar is measured from the lowermost surface 71 to the uppermost surface 70. The second portion 81 of the composite charge is sized and positioned such it will not come into contact with the fairing bar 55, but will conform to the second upper surface of the forming tool. The fairing bar can have an uppermost surface 70 that is about the same or less than the height 58. Compared to forming tool 10, faring bar 55 can be manufactured out of a lightweight and inexpensive materials, provided the material can withstand a temperature of up to 200° F. and the pressures involved in the vacuum forming process.

Heating and/or warming of the composite charge can occur prior to the forming of the composite charge onto the forming tool. Heating/warming of the composite charge allows it to be more easily conformable to the forming tool as opposed to a composite charge at ambient or room temperature. Heating can be accomplished using infrared lamps, conventional light bulbs, or any other known heating techniques. Heating of the composite can continue during the forming process. Depending on the composition of the composite charge, the temperature of the composite charge can be raised to about less than or equal to 200° F. The temperature of the composite charge can be measure in any conventional manner, such as, with attached thermocouples.

Figure 5:
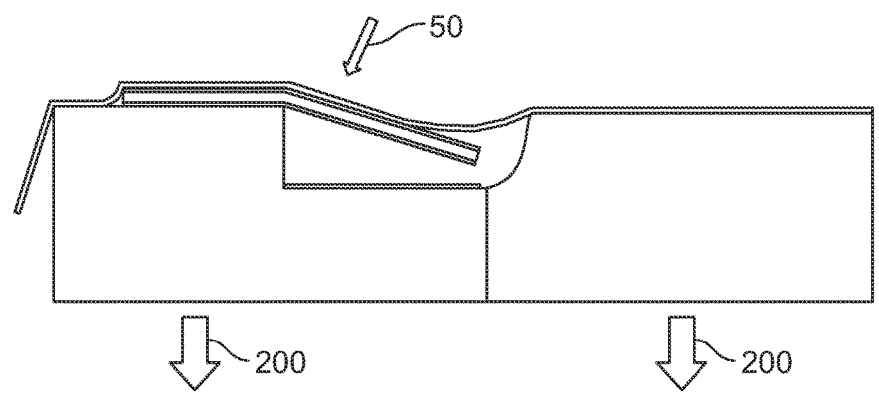
FIG. 5 is an illustration of the lay-up system of FIG. 4 where the vacuum is first applied.

Once the composite charge is in the desired position a forming membrane 24 is applied to cover the forming tool, release film, the fairing bar and composite charge. The forming membrane is preferably composed of silicone, however, other known membranes suitable to vacuum forming can be used, such as, polyvinyl alcohol or nylon based films. Once the forming membrane is in place, the end portions 85 are sealed with a seal, which preferably comprises a butyl rubber or other common vacuum bag sealant tape applied to both the lay-up system perimeter and the underside of the forming membrane 24. Alternatively, an elastomer blade seal could be used to provide a reusable and easily releasable seal. The seal holds end portions 85 of the forming membrane at or near the perimeter edge of the lay-up system 100 in such a manner that when a vacuum is drawn in the direction of arrows 200 this causes the forming membrane to be drawn downward such that the first portion 80 of the composite charge is force downward and conforms to the first upper surface of the forming tool as illustrated in FIG. 5.

Although a number of methods can be used to draw a vacuum to cause the forming membrane to conform to the shape of the tool surface, a preferred approach is to operatively couple a vacuum source to the lay-up system in a known manner so as to operate the vacuum source and draw or pull a vacuum through channels located on an underside of the forming tool or lay-up system base. These channels would be in fluid communication with holes or other orifices extending upwards within an area inside a perimeter defined by the seal securing the forming membrane to the lay-up system. In some circumstances, vacuum can be transported using a nylon tube bag having a breather material inside. Also, in some cases, depending on the design and/or shape of the forming, small holes or orifices can be used to provide a fluid evacuation flow path from the tool surface 11 to an inside or hollow portion of the forming tool. These holes allow the forming membrane to be drawn down more tightly around the forming tool surfaces, especially if the tool is very contoured.

Figure 6:
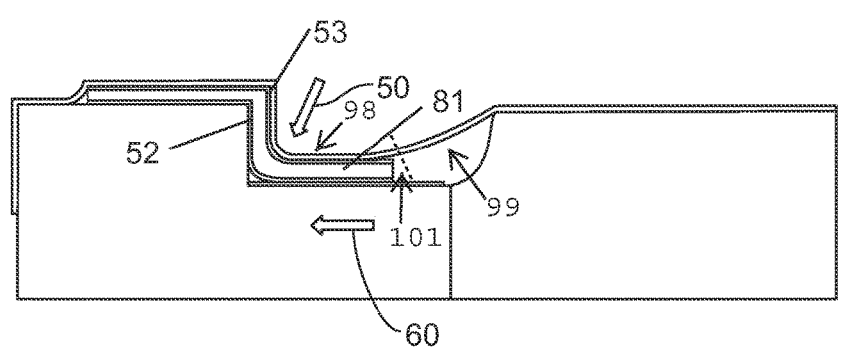
FIG. 6 is an illustration of the lay-up system of FIG. 4 later in the forming process where the second portion of composite charge is conforming to the inner radius of the forming tool as a mechanical force is being applied.

Returning to FIGS. 5-7, these figures illustrate a time lapse schematic representation of the forming process as the vacuum is applied and a mechanical force 50 is applied to the lay-up system in the direction indicated to cause the second portion 81 of composite charge 20 to first conform to the outer radius 44 and then to conform to inner radius 46 and second upper surface 42 of forming tool 10. The release film 52 on the composite charge 24 allows the second portion of the composite charge to slide relative to the forming membrane and the second upper surface of the forming tool. Because the uppermost surface 70 of the fairing bar 55 is above the height 59 of the second upper surface, the forming membrane is supported and prevents the second portion 81 of the composite charge 20 from being force downward onto the second upper surface 42 by the forming membrane 24 as the vacuum pulls the forming membrane downward as indicted by directional arrows 200. (see FIG. 5). As the process continues, the vacuum continues to pull the forming membrane down upon the forming tool as shown in FIG. 6. The forming membrane includes a first portion 98 and a second portion 99 that come together at the dotted line 101. Eventually the second portion of the composite charge contacts the second upper surface of the forming tool. As indicated by directional arrow 60, the second portion slides relative to the upper surface and begins to conform to inner radius 46. The release film 52 and optional release film 53 on the second upper surface, combined with the applied mechanical force 50, allows the second portion 81 to slide along the second upper surface 42 and to conform to the inner radius without wrinkling, bridging, or out-of-plane-buckling of the composite charge. (see FIG. 7).

Once the composite charge has fully conformed to the forming tool and in particular conformed to the inner and outer radii of the forming tool, the heating of the composite charge is stopped and the composite is allowed to cool.

Figure 8:
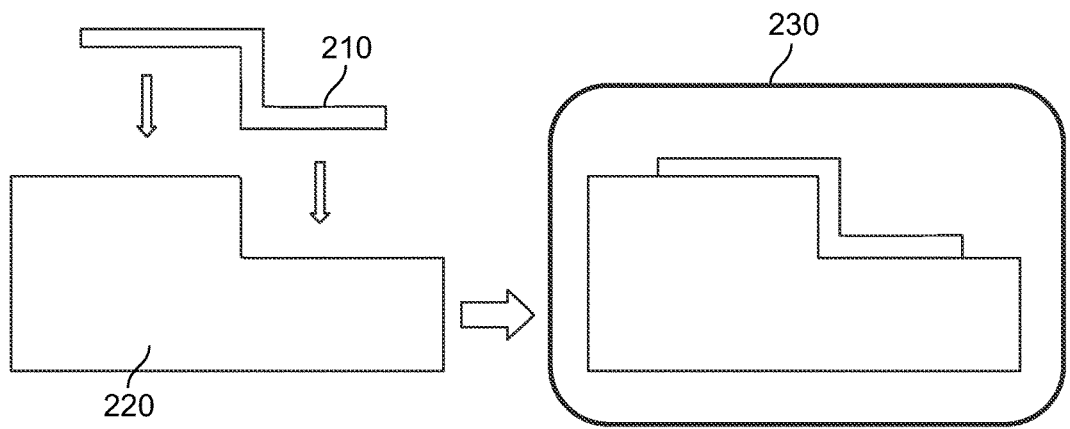
FIG. 8 is an illustration of the formed composite from the system of FIG. 4 being added to a curing tool and then placed in a curing apparatus.

The now formed composite charge 210 (see FIG. 8) can be removed from the forming tool and placed on a curing tool 220. Of course, in some situations it may be advantageous to lay-up the composite charge directly on a curing tool. In the event transfer to a curing tool is needed, the release films used in the lay-up procedure remain with the formed composite charge. The release film is typically needed during vacuum bagging curing in an autoclave. Removal of the formed composite charge 210 may be achieved manually or alternatively, removal may be accomplished in an automated manner with mechanical assistance or with other known manufacturing methods that utilize hands-free methods, such as by use of robotic manipulators. Once on the curing tool 220 the formed composite charge 210 can be vacuum bagged, a vacuum drawn, and placed in a curing apparatus 230, for example, an autoclave, as illustrated in FIG. 8. In some cases the formed composite charge will remain on the forming tool and sent directly to the curing apparatus 230.

In some applications, it may be possible to use additional items of a layup assembly on base tool 10, such as without limitation, doublers, additional release films, and caul plates, along with the composite charge. For example a composite doubler can be sandwiched between the composite charge and a carrier film. Similarly, a strip of release film can be sandwiched between the composite charge and carrier film along the edge margin on the film. This release film may aid in releasing and peeling the carrier film away from the laid up composite charge. It may also be possible to employ a reinforcement in the layer of the composite charge which allows some degree of deforming of the charge, but less than other, non-reinforced areas. The reinforcement may comprise, for example and without limitation, cross-stitching in the composite charge.

The composite charge or pre-cure lamina 20 preferably is a pre-preg or pre-impregnated composite of fibers, where a matrix material, such as epoxy, is already present. The fibers often take the form of a weave and the matrix is used to bond them together and to other components during manufacture. The matrix is only partially cured to allow easy handling. This is known as a B-Stage material and requires cold storage to prevent complete curing. B-Stage pre-preg is always stored in cooled areas since heat accelerates complete polymerization. Composite structures or pre-cure lamina built of multiple plies of pre-pregs will typically require an oven or autoclave to cure the composite structure.

The lay-up system and associated laying-up method can employ one of more carrier films to prevent contamination during transport of the composite charge and to prevent the composite charge from touching any contaminate. Preferably a deformable carrier film is used to support the composite charge during the lay-up of the composite charge and then to transport the charge to a cutting table. As the cutting table typically is not a contact surface, meaning the table should not directly contact the pre-preg material, the carrier film will provide a barrier between the pre-preg and the cutting table. The lay-up composite charge can then be cut using an ultra sonic knife to cut the large charge down to smaller charge pieces that are then lay-up to the forming tool.

The composite charge may be lay-up on the carrier film so as to leave one or more edge margins on the carrier film around the composite charge to facilitate handling of the carrier film and/or attachment of hardware or equipment to the carrier film that may be used to deform, manipulate and/or hold the carrier film during the layup process. ATL (Automated Tape Lay-up) or FTLM (Flat Tape Laminating Machine) can often lay-up charges on a carrier film. In one preferred arrangement, the composite charge may be laid up manually by hand. In an alternative arrangement, the composite charge may be laid up using advanced fiber placement ("AFP") or automated tape laying ("ATP") manufacturing methods (or by any other known method) in the desired positions and orientations as determined during the composite laminate specification and design phase (See, e.g., FIG. 10 Step 432). The carrier film can also be useful for controlled and uniform or non-uniform deforming of composite charge before the lay-up process, and may also be used only as a carrier for transporting the composite charge from an offline layup station to the forming tool 10. As used herein, "deform" and "deforming" refer to stretching and/or shearing of a ply material in one or more directions, including simple and compound curves, and within one or more planes.

Figure 9:
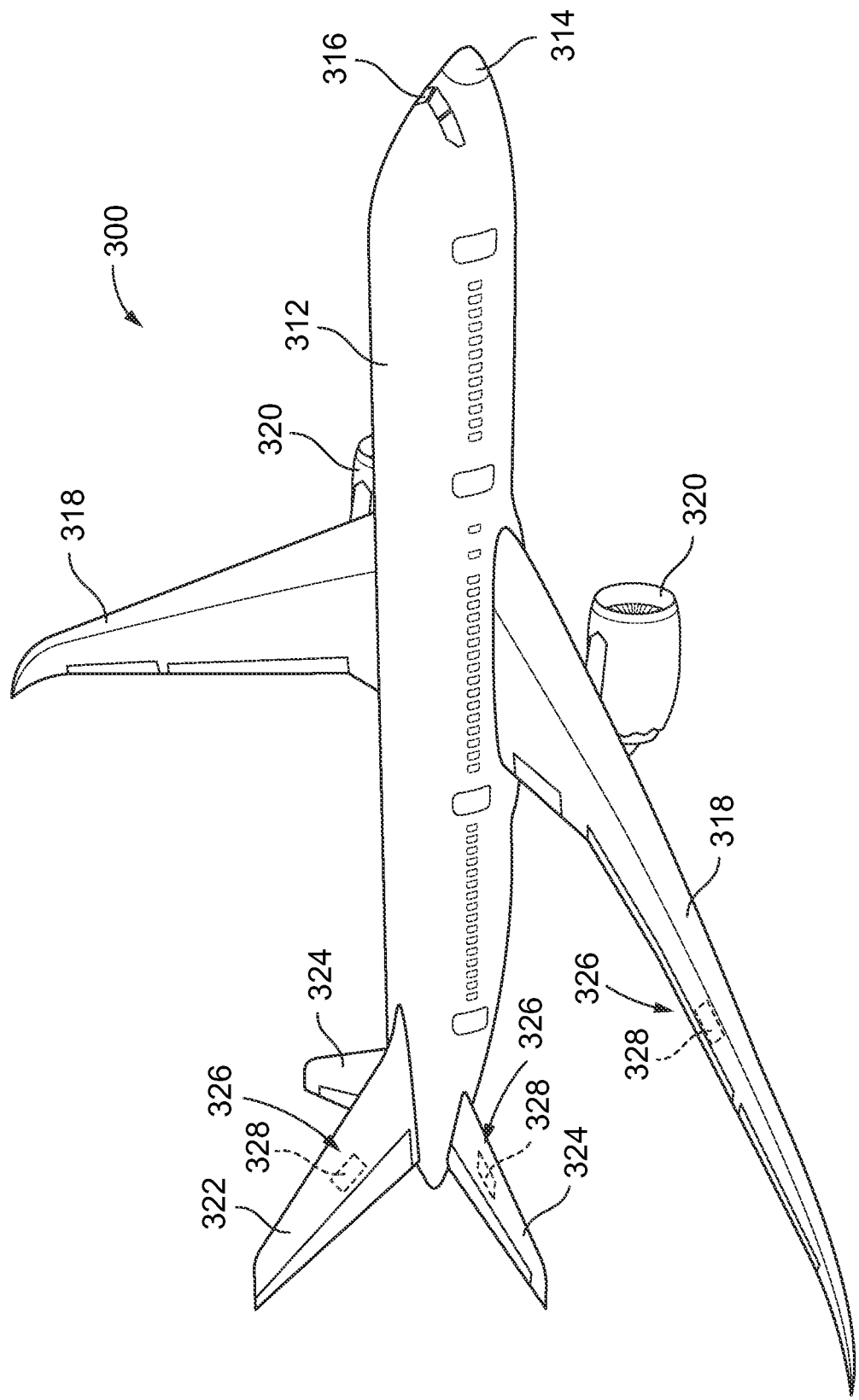
FIG. 9 is an illustration of a perspective view of an aircraft that may incorporate one or more composite laminates manufactured in accordance with one or more embodiments disclosed herein.

FIG. 9 is an illustration of a perspective view of an aircraft 300 that may incorporate one or more composite laminates manufactured by one of the embodiments of the present disclosure. As shown in FIG. 9, the aircraft 300 comprises a fuselage 312, a nose 314, a cockpit 316, wings 318 operatively coupled to the fuselage 320, one or more propulsion units 320, a tail vertical stabilizer 322, and one or more tail horizontal stabilizers 324. Although the aircraft 300 shown in FIG. 9 is generally representative of a commercial passenger aircraft, the one or more composite laminates, as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of structures and methods in accordance with the disclosure may be utilized in other transport vehicles, such as boats and other watercraft, trains, automobiles, trucks, buses, or other suitable transport vehicles formed from or utilizing the composite laminates as disclosed herein.

Figure 10:
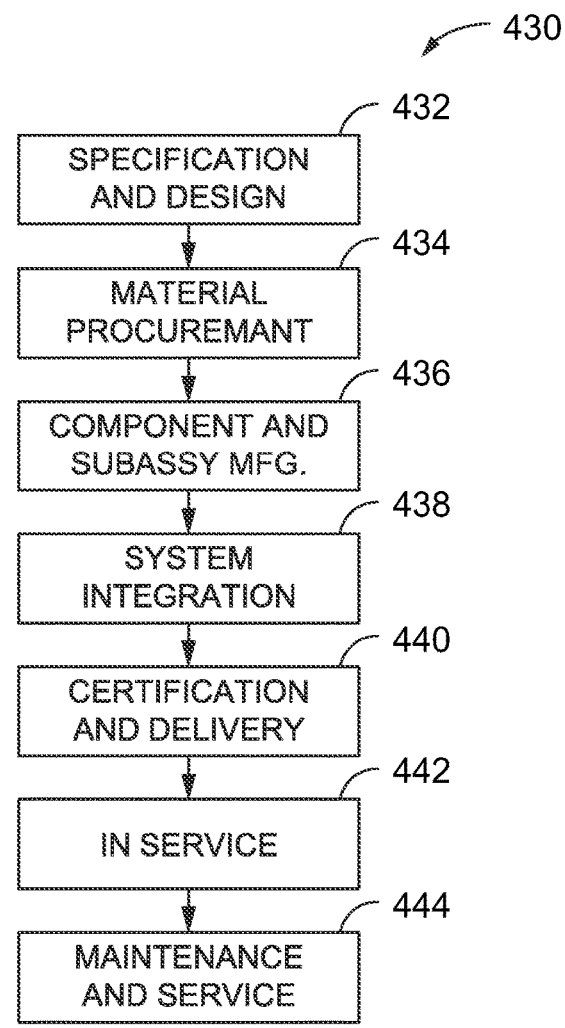
FIG. 10 is an illustration of a flow diagram of an embodiment of an aircraft production and service method of the disclosure.
Figure 11:
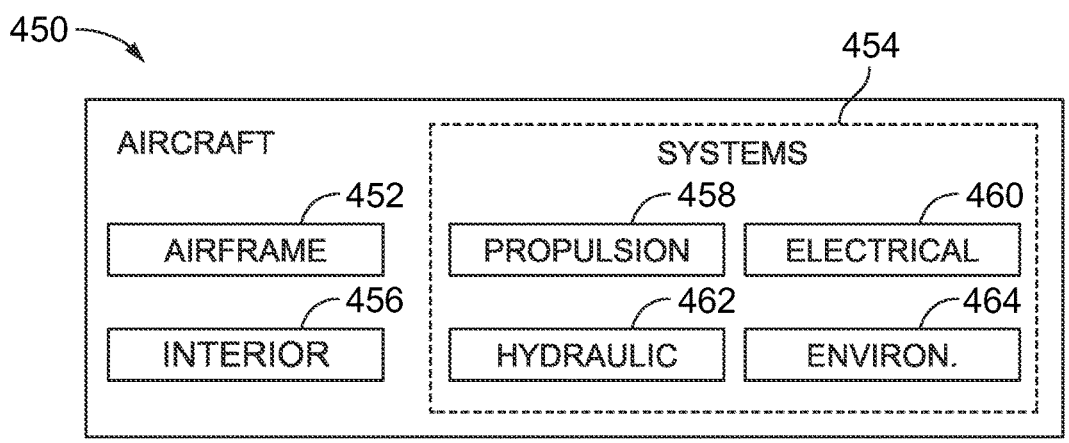
FIG. 11 is an illustration of a functional block diagram of an aircraft.

Embodiments of the disclosure may find use in a variety of potential applications, particularly in the transportation industry, including for example, aerospace, marine, automotive applications and other application where thermoplastic composite tubular structures may be used. Therefore, referring now to FIGS. 10 and 11, embodiments of the disclosure may be used in the context of an aircraft manufacturing and service method 430 as shown in FIG. 10 and an aircraft 450 as shown in FIG. 11. Aircraft applications of the disclosed embodiments may include, for example, without limitation, the design and fabrication of composite laminates fabricated by way of the lay-up methods and systems as disclosed herein.

During pre-production, exemplary method 430 may include specification and design 432 of the aircraft 450 and material procurement 434. As just one example, for the specification and design of the aircraft related composite laminates formed using complex shaped forming tools with inner and outer radii, such as a Z-shape forming tool disclosed herein, may be determined at this step. As just one example, at this step, it may be determined that complex shaped structural supports are needed requiring forming tools having male and female radii.

As another example, during this specification and design step, in one particular composite laminate arrangement, lay-up methods that use release films prevent bridging or out-of-plane buckling of the composite charge at inner radii of the forming tool may be determined. In addition, during this specification and design step, the use of use a fairing bar may be selected with a configuration that supports the forming membrane such that the composite charge can conform precisely to the male and female radii without buckling or bridging. As just another example, at this design step, it may be determined that additional layup assembly items may be required for a specific composite part, such as doublers, release films, and caul plates.

During production, component and subassembly manufacturing 436 and system integration 438 of the aircraft 450 takes place. As explained in greater detail above, FIGS. 1-9 illustrate one preferred type of process steps for fabricating composite laminate utilizing a combination of release films and faring bar configuration in accordance with one aspect of the present disclosure. After such a component and subassembly manufacturing step, the aircraft 450 may go through certification and delivery 440 in order to be placed in service 442. While in service by a customer, the aircraft 450 is scheduled for routine maintenance and service 444, which may also include modification, reconfiguration, refurbishment, and so on.

Each of the process steps of method 450 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 450 produced by exemplary method 430 may include an airframe 452 with a plurality of high-level systems 454 and an interior 456. Examples of high-level systems 454 may include one or more of a propulsion system 458, an electrical system 460, a hydraulic system 462, and an environmental system 464. Any number of other systems may be included. Although an aerospace example is shown, the principles of the disclosure may be applied to other industries, such as the marine and automotive industries.

Systems and methods embodied herein may be employed during any one or more of the stages of the production and service method 430. For example, components or subassemblies corresponding to production process may be fabricated or manufactured in a manner similar to components or subassemblies produced while the aircraft 450 is in service. Also, one or more apparatus embodiments, method embodiments, or a combination thereof may be utilized during the production stages 432 and 434, for example, by substantially expediting assembly of or reducing the cost of an aircraft 450. Similarly, one or more of apparatus embodiments, method embodiments, or a combination thereof may be utilized while the aircraft 450 is in service, for example and without limitation, to maintenance and service 444.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The invention claimed is:

1. A method for forming composite materials, the method comprising:
  providing a composite charge to a lay-up system, where the composite charge comprises upper and lower surfaces;
  applying release film to the upper and lower surfaces of the composite charge;

positioning a first portion of the composite charge across a first upper surface of a forming tool having a first height measured from the first upper surface to a bottom surface;

overhanging a second portion of the composite charge over a second upper surface of the forming tool, wherein the second upper surface has a second height that is less than the first height;

positioning a fairing bar to abut the forming tool, wherein the fairing bar has an uppermost surface, wherein the fairing bar is positioned relative to the forming tool such that the uppermost surface is above the second upper surface of the forming tool;

applying a forming membrane over the composite charge, the release film, the forming tool, and the fairing bar;

sealing the forming membrane around a peripheral edge of the lay-up system;

causing, via applying a vacuum to the lay-up system, a first portion of the forming membrane to conform to the forming tool such that a portion of the second portion of the composite charge is brought into contact with a surface of the forming tool located between the first and second upper surfaces, and causing, via the applied vacuum, a remaining portion of the second portion of the composite charge to contact and slide along the second upper surface, wherein a second portion of the forming membrane (1) overhangs the forming tool and the fairing bar and (2) remains separated from the composite charge, the forming tool, and the fairing bar after the first portion of the forming membrane is conformed to the forming tool such that the portion of the second portion of the composite charge is brought into contact with the surface of the forming tool located between the first and second upper surfaces.

2. The method of claim 1 further comprising heating the composite charge.

3. The method of claim 2 wherein the composite charge is heated before applying the vacuum.

4. The method of claim 1, wherein applying the vacuum comprises applying the vacuum to conform a segment of the composite charge over an outer radius of the forming tool.

5. The method of claim 1 further comprising applying a mechanical force to the second portion of the composite charge to conform the second portion of the composite charge to an inner radius of the forming tool.

6. The method of claim 5, wherein the mechanical force is applied using an urging device that includes at least one of a flexible tip, a spring board, a feather board, an elastic fairing, a compressible material, a pivoting pad, or a spring-loaded pad.

7. The method of claim 1 further comprising forming the composite charge to both an inner and outer radius of the forming tool where the forming membrane does not prevent the second portion of the composite charge from sliding along the second upper surface of the forming tool to conform to the inner radius.

8. The method of claim 1 further characterized in that release film is applied to the second upper surface of the forming tool prior to positioning the composite charge on the forming tool.

* * * * *